US011818665B2

(12) United States Patent
Lahteensuo et al.

(10) Patent No.: US 11,818,665 B2
(45) Date of Patent: Nov. 14, 2023

(54) SIGNAL QUALITY VERIFICATION METHOD

(71) Applicant: Nokia Technologies Oy, Espoo (FI)

(72) Inventors: Toni Lahteensuo, Helsinki (FI); Sari Nielsen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/629,860

(22) PCT Filed: Aug. 11, 2020

(86) PCT No.: PCT/IB2020/057551
§ 371 (c)(1),
(2) Date: Jan. 25, 2022

(87) PCT Pub. No.: WO2021/028835
PCT Pub. Date: Feb. 18, 2021

(65) Prior Publication Data
US 2022/0256475 A1 Aug. 11, 2022

Related U.S. Application Data

(60) Provisional application No. 62/887,263, filed on Aug. 15, 2019.

(51) Int. Cl.
*H04B 17/309* (2015.01)
*H04W 52/24* (2009.01)
(52) U.S. Cl.
CPC ........ *H04W 52/241* (2013.01); *H04B 17/309* (2015.01)

(58) Field of Classification Search
CPC ........................ H04W 52/241; H04B 17/309
See application file for complete search history.

(56) References Cited

U.S. PATENT DOCUMENTS

| 5,600,787 A * | 2/1997 | Underwood ... G01R 31/318328 714/33 |
| 10,368,365 B2 * | 7/2019 | Akula ............... H04W 72/1268 |
| 10,985,959 B2 * | 4/2021 | Rahman ............. H04W 52/362 |
| 11,115,979 B2 * | 9/2021 | Åhlander .......... H04W 52/0216 |
| 11,553,513 B2 * | 1/2023 | Falconetti ............ H04L 5/0082 |

(Continued)

FOREIGN PATENT DOCUMENTS

WO 2018/174802 A1 9/2018
WO WO-2018174802 A1 * 9/2018 ........... H04L 5/0053

OTHER PUBLICATIONS

"3rd Generation Partnership Project; Technical Specification Group Radio Access Network; NR; User Equipment (UE) radio transmission and reception; Part 2: Range 2 Standalone (Release 15)", 3GPP TS 38.101-2, V15.5.0, Mar. 2019, pp. 1-142.

(Continued)

*Primary Examiner* — Hai V Nguyen
(74) *Attorney, Agent, or Firm* — Nokia Technologies Oy

(57) ABSTRACT

According to a first embodiment, a method may include initiating, by a user equipment, at least one transient-inducing event. The method may further include entering, by the user equipment, at least one first state associated with at least one first state requirement configuration. The method may further include transmitting, by the user equipment, at least one first signal to a network entity according to the at least one first state requirement configuration.

20 Claims, 7 Drawing Sheets

(56) References Cited

U.S. PATENT DOCUMENTS

| | | | | |
|---|---|---|---|---|
| 2016/0285709 A1* | 9/2016 | Chaudhuri | .......... | H04W 4/025 |
| 2019/0150050 A1* | 5/2019 | Kinthada Venkata | ........ | |
| | | | | H04W 36/30 |
| | | | | 370/334 |
| 2019/0297572 A1* | 9/2019 | Rahman | .......... | H04W 72/1268 |
| 2020/0007370 A1* | 1/2020 | Rahman | .......... | H04L 27/2602 |
| 2020/0389850 A1* | 12/2020 | He | ........ | H04W 52/225 |
| 2021/0045062 A1* | 2/2021 | Ryu | ........ | H04W 52/10 |
| 2021/0136754 A1* | 5/2021 | Ahlander | .......... | H04L 5/0053 |
| 2021/0282170 A1* | 9/2021 | Falconetti | .......... | H04W 72/20 |

OTHER PUBLICATIONS

"On ON-to-ON transient period", 3GPP TSG-RAN WG4 Meeting #91, R4-1906028, Agenda: 6.5.5.7, Intel Corporation, May 13-17, 2019, pp. 1-3.

"Transient period capability", 3GPP TSG-RAN4 Meeting #91, R4-1906941, Agenda: 6.5.5.7, Qualcomm Incorporated, May 3, 2019, pp. 1-7.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

International Search Report and Written Opinion received for corresponding Patent Cooperation Treaty Application No. PCT/IB2020/057551, dated Dec. 10, 2020, 19 pages.

"Optional Transient Time Capability Signaling for REL-16 UEs", 3GPP TSG-RAN WG4 Meeting #90Bis, R4-1904343, Agenda: 6.5.5., Skyworks Solutions, Inc, Apr. 8-12, 2019, 3 pages.

"3rd Generation Partnership Project; Technical Specification Group Radio Access Network; NR; User Equipment (UE) radio transmission and reception; Part 1: Range 1 Standalone (Release 16)", 3GPP TS 38.101-1, V16.0.0, Jun. 2019, pp. 1-268.

* cited by examiner

SIGNAL QUALITY VERIFICATION METHOD

RELATED APPLICATION

This application claims priority to PCT Application No. PCT/IB2020/057551, filed on Aug. 11, 2020, which claims priority to U.S. Application No. 62/887263 filed on Aug. 15, 2019, each of which is incorporated herein by reference in its entirety.

BACKGROUND

Field

Certain embodiments may relate to wireless communication systems. For example, some embodiments may relate to transient period measurements.

Description of the Related Art

Under fourth generation (4G) long-term evolution (LTE), user equipment (UE) transient time, which is the time that a UE adjusts signal power before reaching a stable state, is specified at 20 μs. Following a 20 μs period, the UE may need to fulfill various signal quality requirements, such as error vector magnitude (EVM), also known as relative constellation error (RCE). In transitioning from 4G LTE to 5G NR, subcarrier spacing for data transmissions was increased from 15 kHz up to 120 kHz, and, due to time-frequency duality, symbol times under 5G NR were decreased by 1/8 compared to 4G LTE. However, the transition from 4G LTE to 5G NR did not include scaling of allowed transition times. For example, allowed transition times under 4G LTE in frequency range 1 (FR1) (<7.125 GHz) are 10μs, while allowed transition times under 5G NR are 5 μs. Similarly, in 1-R2 (24 GHz-52.6 GHz), allowed transition times are 5 μs. Thus, the transient allowed times relative to symbol times is up to twice as long for 4G LTE.

BRIEF DESCRIPTION OF THE DRAWINGS

For proper understanding of this disclosure, reference should be made to the accompanying drawings, wherein.

DETAILED DESCRIPTION

Figure 1:
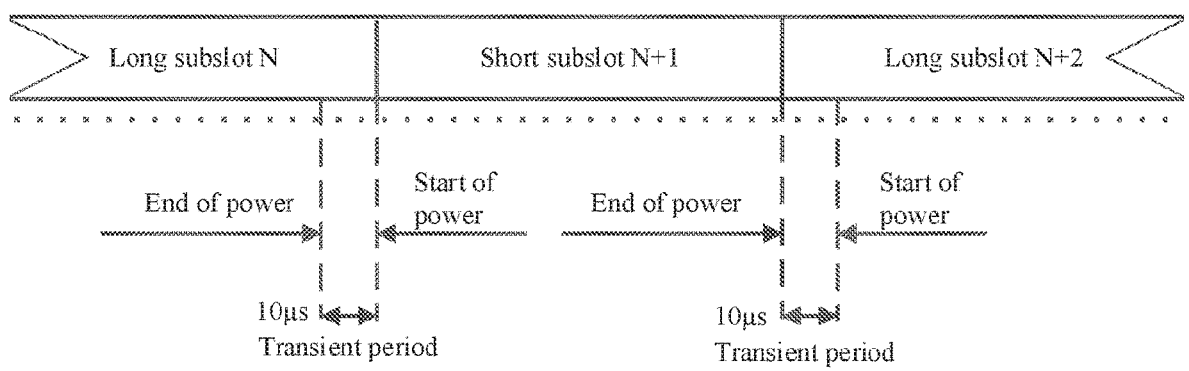
FIG. 1 illustrates an example of subslots separated by transient periods.

Due to the short symbols and long transient times, demodulation performance of a base station may suffer since the behavior of a base station during transient times may overlap into the data part of the symbol. In order to minimize performance degradation of the base station demodulation during the transient period, UE requirement specifications define the transient period requirement as occurring during a slot or channel to minimize its impact. For example, 3GPP technical specification (TS) 38.101-2 discusses an example where a 10 μs transient period may always be coupled with a long subslot in order to avoid impacting any short subslots, which would otherwise result in degradation of base station demodulation performance Similarly, periods of transient times are defined separately for changes in physical channels, such as between at least one physical uplink control channel (PUCCH), at least one physical uplink shared channel (PUSCH), and at least one sounding reference signal (SRS), in order to avoid impacting more sensitive channels, especially those transmitted in shorter transient time periods, as illustrated in FIG. 1.

Current 3GPP Rel-15 UE requirements and test cases only specify transient periods where NR UE have no requirements for transmission. Following this transient period, the EVM and power level requirements and test cases apply for the NR UE's transmission.

Under 3GPP TS 38.101-1 and -2, transient time period requirements are time measurements, at the end of which, a UE needs to have reached a target power level. However, one drawback of this technique is that power level and EVM requirements may completely exclude transient time periods since power level and EVM only need to be met after the transient period has ended, as well as the EVM requirement only being an average over multiple slots transmitted at constant transmission power. Furthermore, merely calculating transient times may be insufficient to identify transients since any degraded signal quality occurring during the settling period would not be included in the calculation, failing to improve the performance of the receiver.

Figure 2:
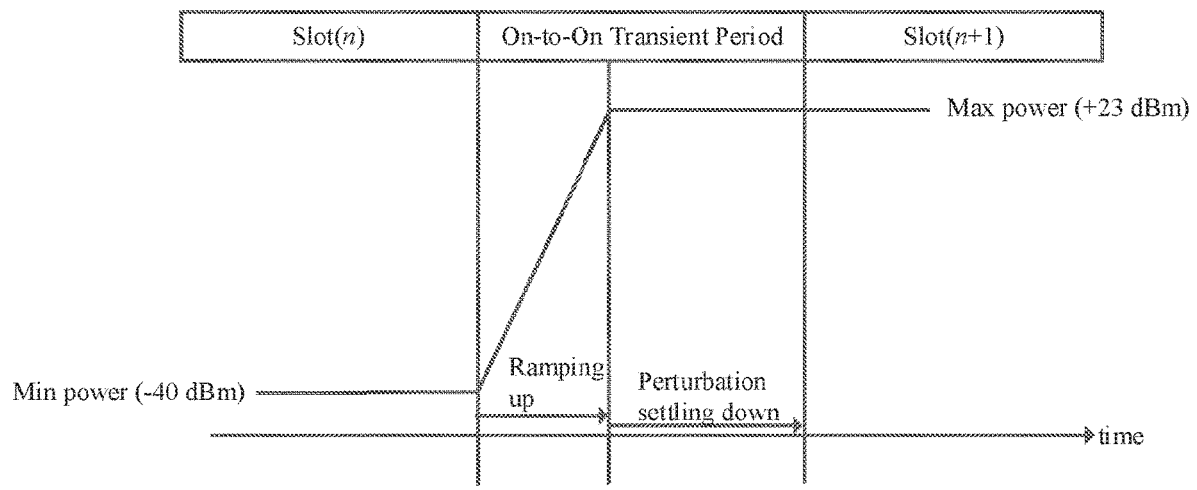
FIG. 2 illustrates an example of separate ramp up and settling down periods.
Figure 3:
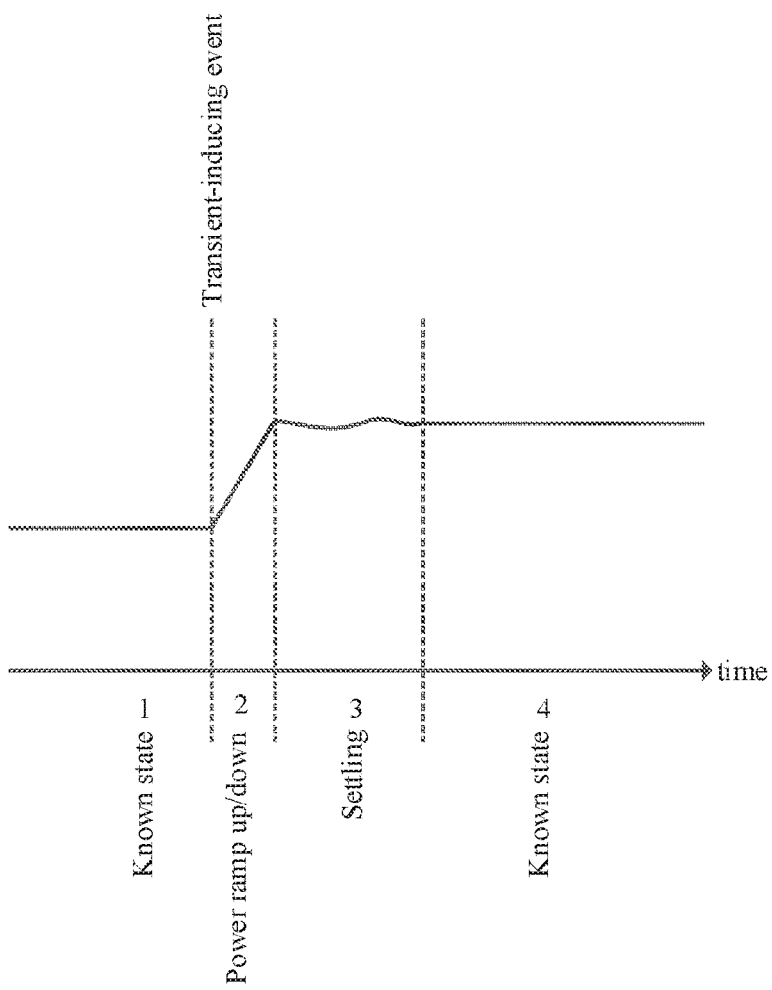
FIG. 3 illustrates an example of a transition process between known UE states.

Alternatively, using only EVM-based verification techniques also fails to provide accurate transient measurements since a UE may be unable to achieve certain signal quality requirements following a shortened transition time period. For example, 3GPP R4-1906028 describes transient time periods made up of a power ramp up/down time and settling period, as illustrated in FIG. 2. Furthermore, 3GPP R4-1906941 discusses that an EVM may be used to verify transient times. However, after the transient time period, there exist no solutions on relaxing an EVM requirement from current requirements while still being verified with constant power levels and without transients.

In order to address at least these disadvantages, certain embodiments described herein may help to improve requirement coverages, testing times, and base station demodulation performance by verifying transient time, signal power, and quality requirements together in sequence. Some example embodiments described herein may have various benefits and/or advantages. For example, some embodiments may improve throughput and user experience for end users. Furthermore, various embodiments may enable the testing of equipment to measure UE transmission power and/or error vector magnitude for the actual UE transmitted signal. Also, dividing the transient period, for example, into a power ramping period and a settling down period, may benefit the demodulation performance of the base station since the base station receiver may utilize the known power level and use the signal content to improve the demodulation before reaching the final known state when the UE is able to meet both the power level and EVM requirements and test cases for the UE transmitted signal, specifically, after the whole transient period). Furthermore, the performance of a base station receiver for any symbol at least partly overlapping with the transient period may be improved if the base station is aware that the user equipment has already reached a power level required by that period despite an actual sufficient modulation quality not being reached and, thus, the user equipment cannot yet meet the EVM requirements.

This combination of the EVM measurement may also improve the requirement coverage since EVM is currently verified at a constant power level without transients. The verification of transient times and EVM together improves testing times, eliminating wasteful functions since separate EVM tests may be omitted. Furthermore, establishing a power requirement after the transient period may couple known signal behavior with EVM measurements following the settling period. In addition, certain embodiments may allow URLLC types of industrial internet of things (IIoT) solutions and services to improve performance during short ramp up and down periods with short signals. Certain embodiments are, therefore, directed to improvements in computer-related technology, for example, by conserving network resources and reducing power consumption of network entities and/or user equipment located within the network.

As noted above, various embodiments described herein describe combining transient time metrics—such as power level and transient time—with signal quality metrics, such as EVM. Rather than measuring EVM separately at a constant transmission power, EVM performance may be verified immediately after a pre-determined transient time period. In addition, a transient time period may or may not be divided into multiple segments of varying requirements. Some embodiments described herein may be adopted into 5G NR standards by combining transient times and EVM to quickly and more comprehensively verify transients.

Figure 4:
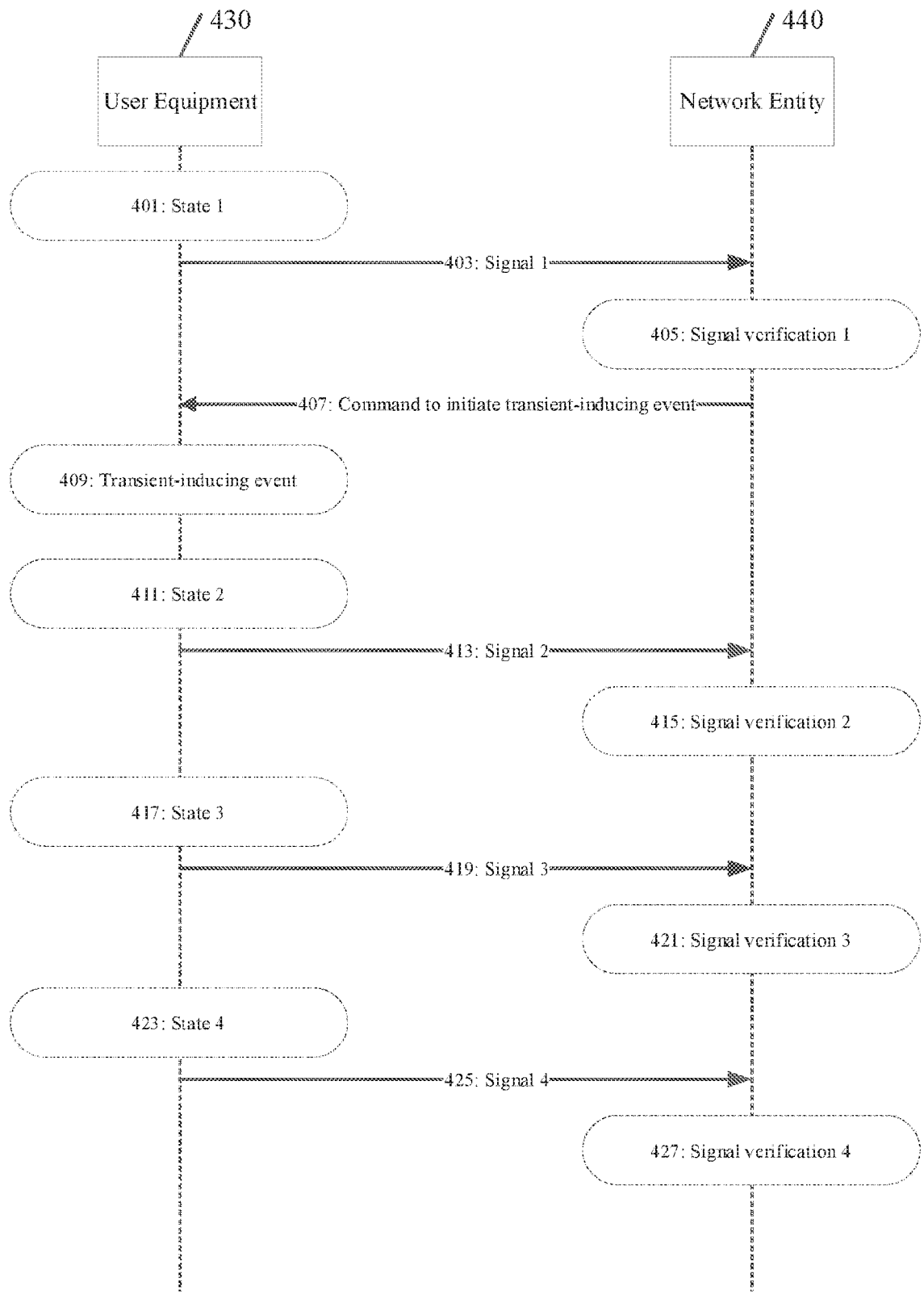
FIG. 4 illustrates a signaling diagram according to certain embodiments.

FIG. 4 illustrates an example of a signalling diagram according to some embodiments. UE 430 and network entity (NE) 440 may be similar to UE 710 and/or NE 720, respectively, in FIG. 7. Although only a single UE and a single NE are illustrated, a communications network may contain one or more of both of these entities.

In step 401, UE 430 may enter at least one first state, which may be associated with at least one behavior known to NE 440, such as one or more of at least one period of continuous transmission and at least one period of no transmission. The at least one first state may be associated with at least one first state requirement configuration, which may comprise at least one requirement. For example, the at least one requirement of the at least one first state requirement configuration may comprise one or more of at least one power level requirement, at least one transient time, at least one signal quality requirement, at least one output power accuracy requirement, at least one EVM requirement, and/or at least one power OFF requirement. In step 403, UE 430 may transmit at least one first signal to NE 440 according to the at least one first state requirement configuration.

In step 405, NE 440 may verify the at least one first signal, for example, verifying that UE 430 does not enter the at least one first state before a pre-determined period of time, and in step 407, NE 440 may transmit at least one command to initiate at least one transient-inducing event to UE 430.

In step 409, UE 430 may initiate at least one transient-inducing event. In some embodiments, the at least one transient-inducing event may comprise one or more of at least one transmission start, at least one power control command, at least one resource block allocation size change, at least one power level change, at least one frequency hopping function, at least one transmitted channel change, and/or at least one transmission type change. The at least one transient-inducing event may trigger UE 430 to enter at least one second state.

In step 411, UE 430 may enter the at least one second state, which may be a power ramp up/down period and/or may be associated with at least one behavior unknown to NE 440. The at least one second state may be associated with at least one second state requirement configuration, which may be unrelated with a power level requirement and/or a signal quality requirement. In step 413, UE 430 may transmit at least one second signal to NE 440 according to the at least one second state requirement configuration.

In step 415, NE 440 may verify the at least one second signal, for example, verifying the at least one second state, which may not include any power level and/or signal quality requirements.

In step 417, UE 430 may enter at least one third state, which may be associated with at least one stable power level and/or at least one settling period. The at least one third state may be associated with at least one third state requirement configuration, which may comprise at least one requirement. For example, the at least one requirement of the at least one third state requirement configuration may comprise one or more of at least one power level requirement, at least one transient time, at least one signal quality requirement, at least one output power accuracy requirement, at least one EVM requirement, and/or at least one power OFF requirement. In step 419, UE 430 may transmit at least one third signal to NE 440 according to the at least one third state requirement configuration.

In step 421, NE 440 may verify the at least one third signal, for example, at least one requirement of the at least one third state requirement configuration.

In step 423, UE 430 may enter at least one fourth state, which may be associated with at least one stable state and/or at least one behavior known to NE 440. The at least one fourth state may be associated with at least one fourth state requirement configuration, which may comprise at least one requirement. For example, the at least one requirement of the at least one fourth state requirement configuration may comprise one or more of at least one power level requirement, at least one transient time, at least one signal quality requirement, at least one output power accuracy requirement, at least one EVM requirement, and/or at least one power OFF requirement. At least one requirement of the at least one fourth state requirement configuration may be the same as at least one requirement of the at least one first state requirement configuration. Additionally or alternatively, at least one requirement of the at least one fourth state requirement configuration may be different from at least one requirement of the at least one first state requirement configuration. In some embodiments, at least one requirement of the at least one fourth state requirement configuration may be equal to and/or different from at least one requirement of the at least one first state requirement configuration.

In step 425, UE 430 may transmit at least one fourth signal to NE 440 according to the at least one fourth state requirement configuration.

In step 427, NE 440 may verify the at least one fourth signal, for example, at least one requirement of the at least one fourth state requirement configuration.

Figure 5:
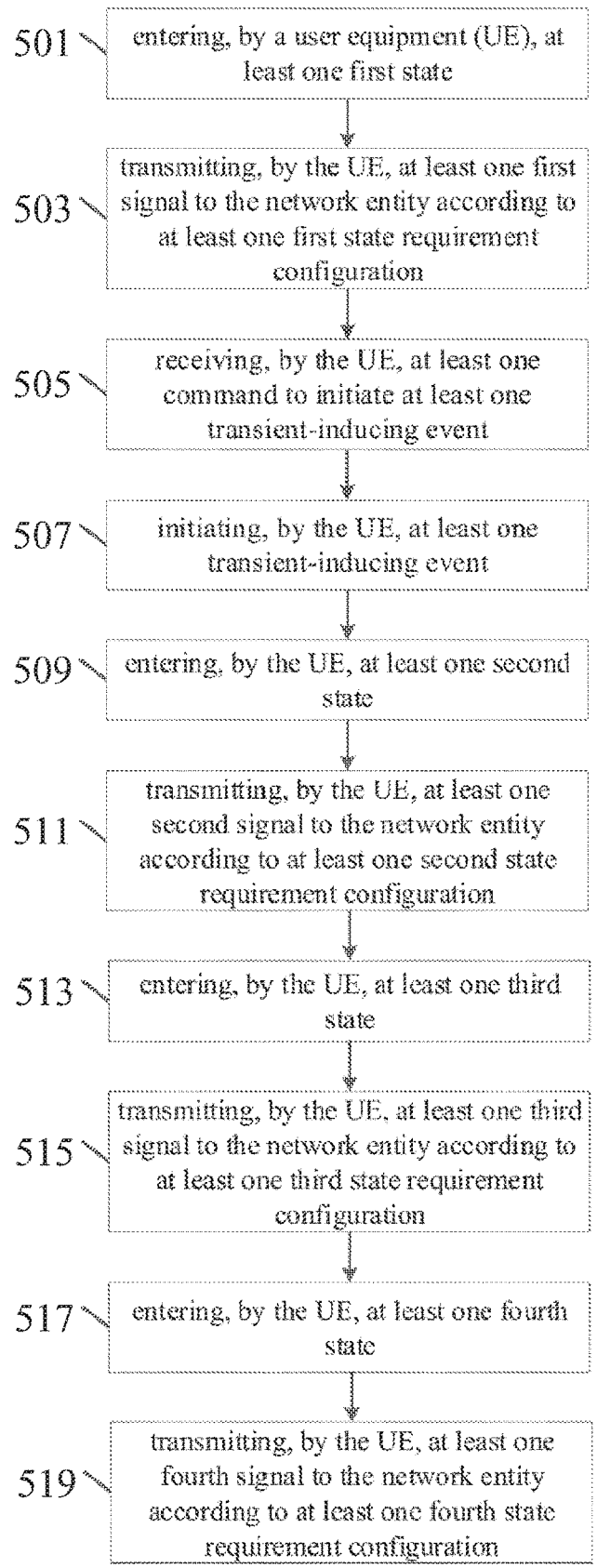
FIG. 5 illustrates an example of a method performed by a UE according to certain embodiments.
Figure 7:
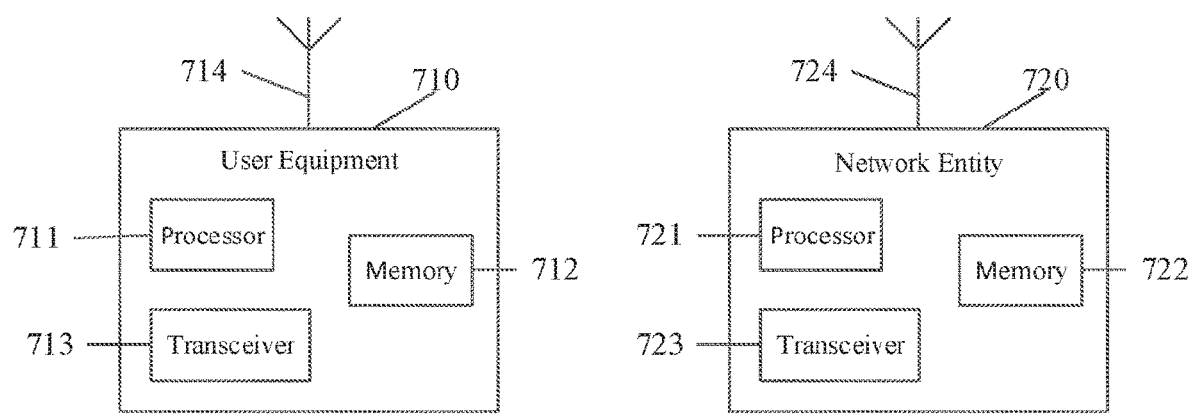
FIG. 7 illustrates an example of a system according to certain embodiments.

FIG. 5 illustrates an example of a method that may be performed by a UE, for example, UE 710 in FIG. 7. In step 501, the UE may enter at least one first state, which may be associated with at least one behavior known to a NE, such as NE 720 in FIG. 7. In certain embodiments, the at least one first state may be associated with one or more of at least one period of continuous transmission and/or at least one period of no transmission. The at least one first state may be associated with at least one first state requirement configuration, which may comprise at least one requirement. For example, the at least one requirement of the at least one first state requirement configuration may comprise one or more of at least one power level requirement, at least one transient time, at least one signal quality requirement, at least one output power accuracy requirement, at least one EVM requirement, and/or at least one power OFF requirement. In step 503, the UE may transmit at least one first signal to the NE according to the at least one first state requirement configuration, and in step 505, the UE may receive at least one command to initiate at least one transient-inducing event.

In step 507, the UE may initiate at least one transient-inducing event. In some embodiments, the at least one transient-inducing event may comprise one or more of at least one transmission start, at least one power control command, at least one resource block allocation size change, at least one power level change, at least one frequency hopping function, at least one transmitted channel change, and/or at least one transmission type change. The at least one transient-inducing event may trigger the UE to enter at least one second state.

In step 509, the UE may enter the at least one second state, which may be a power ramp up/down period and/or may be associated with at least one behavior unknown to the NE. The at least one second state may be associated with at least one second state requirement configuration, which may be associated with requirements unrelated with a power level requirement and/or a signal quality requirement. In step 511, the UE may transmit at least one second signal to the NE according to the at least one second state requirement configuration.

In step 513, the UE may enter at least one third state, which may be associated with at least one stable power level and/or at least one settling period. The at least one third state may be associated with at least one third state requirement configuration, which may comprise at least one requirement. For example, the at least one requirement of the at least one third state requirement configuration may comprise one or more of at least one power level requirement, at least one transient time, at least one signal quality requirement, at least one output power accuracy requirement, at least one EVM requirement, and/or at least one power OFF requirement. In step 515, the UE may transmit at least one third signal to the network entity according to the at least one third state requirement configuration.

In step 517, the UE may enter at least one fourth state, which may be associated with at least one stable state and/or at least one behavior known to the NE. The at least one fourth state may be associated with at least one fourth state requirement configuration, which may comprise at least one requirement. For example, the at least one requirement of the at least one fourth state requirement configuration may comprise one or more of at least one power level requirement, at least one transient time, at least one signal quality requirement, at least one output power accuracy requirement, at least one EVM requirement, and/or at least one power OFF requirement. At least one requirement of the at least one fourth state requirement configuration may be the same as at least one requirement of the at least one first state requirement configuration. Additionally or alternatively, at least one requirement of the at least one fourth state requirement configuration may be different from at least one requirement of the at least one first state requirement configuration. In some embodiments, at least one requirement of the at least one fourth state requirement configuration may be equal to and/or different from at least one requirement of the at least one first state requirement configuration. In step 519, the UE may transmit at least one fourth signal to the network entity according to the at least one fourth state requirement configuration.

Figure 6:
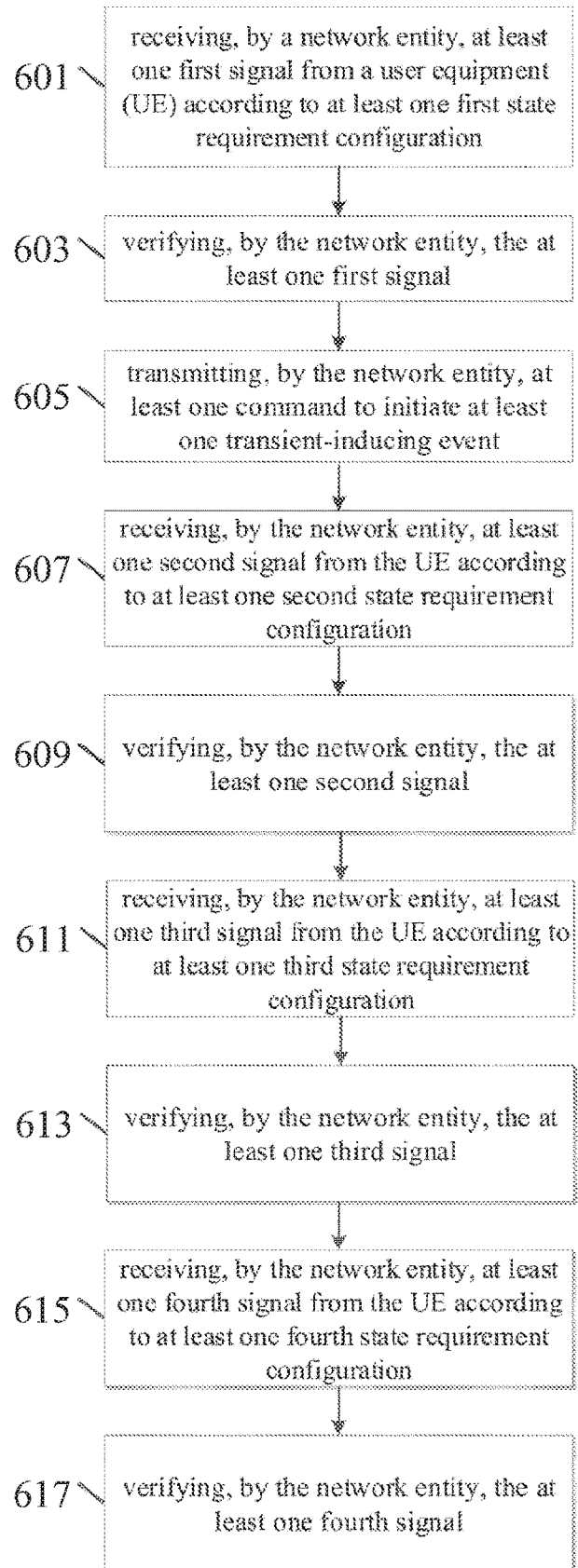
FIG. 6 illustrates an example of a method performed by a network entity according to certain embodiments.

FIG. 6 illustrates an example of a method that may be performed by a NE, for example, NE 720 in FIG. 7. In step 601, the NE may receive at least one first signal according to at least one first state requirement configuration of at least one first state, which may be associated with at least one behavior known to the NE, from a UE, such as UE 710 in FIG. 7. In certain embodiments, the at least one first state may be associated with one or more of at least one period of continuous transmission and at least one period of no transmission. The at least one first state requirement configuration may comprise at least one requirement. For example, the at least one requirement of the at least one first state requirement configuration may comprise one or more of at least one power level requirement, at least one transient time, at least one signal quality requirement, at least one output power accuracy requirement, at least one EVM requirement, and/or at least one power OFF requirement.

In step 603, the NE may verify the at least one first signal, for example, verifying that the UE does not enter the at least one first state before a pre-determined period of time, and in step 605, the NE may transmit at least one command for the UE to initiate at least one transient-inducing event to the UE.

In step 607, in response to the UE initiating at least one transient-inducing event and/or entering at least one second state, the NE may receive at least one second signal from the UE according to at least one second state requirement configuration of the second state. In some embodiments, the at least one transient-inducing event may comprise one or more of at least one transmission start, at least one power control command, at least one resource block allocation size change, at least one power level change, at least one frequency hopping function, at least one transmitted channel change, and/or at least one transmission type change. The at least one transient-inducing event may be configured to trigger the UE to enter at least one second state.

In step 609, the NE may verify the at least one second signal, for example, at least one requirement of the at least one second state requirement configuration.

In step 611, in response to the UE entering at least one third state, the NE may receive at least one third signal from the UE according to at least one third state requirement configuration of the third state. The at least one third state requirement configuration may comprise at least one requirement. For example, the at least one requirement of the at least one third state requirement configuration may comprise one or more of at least one power level requirement, at least one transient time, at least one signal quality requirement, at least one output power accuracy requirement, at least one EVM requirement, and at least one power OFF requirement.

In step 613, the NE may verify the at least one third signal, for example, at least one requirement of the at least one third state requirement configuration.

In step 615, in response to the UE entering at least one fourth state, the NE may receive at least one fourth signal from the UE according to at least one fourth state requirement configuration, which may be associated with the at least one fourth state. The at least one fourth state may be at least one stable state and/or associated with at least one behavior known to the NE. The at least one fourth state requirement configuration may comprise at least one requirement. For example, the at least one requirement of the at least one fourth state requirement configuration may comprise one or more of at least one power level requirement, at least one transient time, at least one signal quality requirement, at least one output power accuracy requirement, at least one EVM requirement, and/or at least one power OFF requirement. At least one requirement of the at least one fourth state requirement configuration may be the same as at least one requirement of the at least one first state requirement configuration. Additionally or alternatively, at least one requirement of the at least one fourth state requirement configuration may be different from at least one requirement of the at least one first state requirement configuration. In some embodiments, at least one requirement of the at least one fourth state requirement configuration may be equal to and/or different from at least one requirement of the at least one first state requirement configuration.

In step 617, the NE may verify the at least one fourth signal, for example, at least one requirement of the at least one fourth state requirement configuration.

FIG. 7 illustrates an example of a system according to certain example embodiments. In one example embodiment, a system may include multiple devices, such as, for example, UE 710 and/or NE 720.

UE 710 may include one or more of a device under testing, a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 720 may be one or more of a test equipment, a network emulator, a device under testing, a base station emulator, a base station, such as an evolved node B (eNB) or 5G or New Radio node B (gNB), a serving gateway, a server, and/or any other access node or combination thereof. Furthermore, UE 710 and/or NE 720 may be one or more of a citizens broadband radio service device (CBSD).

One or more of these devices may include at least one processor, respectively indicated as 711 and 721. Processors 711 and 721 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 712 and 722. The memory may be fixed or removable. The memory may include computer program instructions or computer code contained therein. Memories 712 and 722 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 711 and 721 and memories 712 and 722 or a subset thereof, may be configured to provide means corresponding to the various blocks of FIGS. 3-6. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 7, transceivers 713 and 723 may be provided, and one or more devices may also include at least one antenna, respectively illustrated as 714 and 724. The device may have many antennas, such as an array of antennas configured for multiple input multiple output (MIMO) communications, or multiple antennas for multiple radio access technologies. Other configurations of these devices, for example, may be provided. Transceivers 713 and 723 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 3-6). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 3-6. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware The features, structures, or characteristics of certain example embodiments described throughout this specification may be combined in any suitable manner in one or more example embodiments. For example, the usage of the phrases "certain example embodiments," "some example embodiments," "other example embodiments," or other similar language, throughout this specification refers to the fact that a particular feature, structure, or characteristic described in connection with the example embodiment may be included in at least one example embodiment of the present invention. Thus, appearance of the phrases "in certain example embodiments," "in some example embodiments," "in other example embodiments," or other similar language, throughout this specification does not necessarily refer to the same group of example embodiments, and the described features, structures, or characteristics may be combined in any suitable manner in one or more example embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary
3GPP 3rd Generation Partnership Project
4G 4th Generation Mobile Network
5G 5th Generation Mobile Network
BS Base Station
DUT Device Under Test
EVM Error Vector Magnitude
FR Frequency Range
IIoT Industrial Internet of Things
LTE Long-Term Evolution
μs Microsecond
NG-RAN NG Radio Access Network
NR New Radio
PUCCH Physical Uplink Control Channel
PUSCH Physical Uplink Shared Channel
RAN Radio Access Network
RB Resource Block
RF Radio Frequency
SRS Sounding Reference Signal
TS Technical Specification
Tx Transmission
UE User Equipment
URLLC Ultra-Reliable Low-Latency Communication According to a first embodiment, a method may include initiating, by a user equipment, at least one transient-inducing event. The method may further include entering, by the user equipment, at least one first state associated with at least one first state requirement configuration. The method may further include transmitting, by the user equipment, at least one first signal to a network entity according to the at least one first state requirement configuration.

In a variant, the at least one transient-inducing event may comprise one or more of at least one transmission start, at least one power control command, at least one resource block allocation size change, at least one power level change, at least one frequency hopping function, at least one transmitted channel change, and/or at least one transmission type change.

In a variant, the at least one first state may be associated with at least one first state requirement configuration, which may comprise at least one requirement.

In a further variant, the at least one requirement of the at least one first state requirement configuration may comprise one or more of at least one power level requirement, at least one transient time, at least one signal quality requirement, at least one output power accuracy requirement, at least one EVM requirement, and/or at least one power OFF requirement.

In a variant, the at least one transient-inducing event may trigger the user equipment to enter the at least one first state.

In a variant, the at least one first state may be a power ramp up/down period and/or may be associated with at least one behavior unknown to the network entity.

In a variant, the initiating by the user equipment may be based on at least one command to initiate at least one transient-inducing event from the network entity.

According to a second embodiment, a method may include verifying, by a network entity, at least one first signal according to at least one first state requirement configuration received from a user equipment. The method may further include receiving, by the network entity, at least one second signal from the user equipment according to at least one second state requirement configuration. The method may further include verifying, by the network entity, the at least one second signal according to one or more of at least one power level requirement, at least one signal quality requirement and/or at least one EVM requirement.

In a variant, the at least one first state requirement configuration may comprise one or more of at least one power level requirement, at least one transient time, at least one signal quality requirement, at least one output power accuracy requirement, at least one EVM requirement, and/or at least one power OFF requirement.

In a variant, the at least one second signal may be received from the user equipment during a power ramp up/down state.

In a variant, the at least one second signal may be received during a state associated with at least one behavior unknown to the network entity.

In a variant, the method of the second embodiment may further comprise transmitting at least one command to initiate at least one transient-inducing event to the user equipment.

According to a third embodiment and a fourth embodiment, an apparatus can include at least one processor and at least one memory and computer program code. The at least one memory and the computer program code can be configured to, with the at least one processor, cause the apparatus at least to perform a method according to the first embodiment, the second embodiment, and any of their variants.

According to a fifth embodiment and a sixth embodiment, an apparatus can include means for performing the method according to the first embodiment, the second embodiment, and any of their variants.

According to a seventh embodiment and an eighth embodiment, a computer program product may encode instructions for performing a process including a method according to the first embodiment, the second embodiment, and any of their variants.

According to a ninth embodiment and a tenth embodiment, a non-transitory computer-readable medium may encode instructions that, when executed in hardware, perform a process including a method according to the first embodiment, the second embodiment, and any of their variants.

According to an eleventh embodiment and a twelfth embodiment, a computer program code may include instructions for performing a method according to the first embodiment, the second embodiment, and any of their variants.

According to a thirteenth embodiment and a fourteenth embodiment, an apparatus may include circuitry configured to perform a process including a method according to the first embodiment, the second embodiment, and any of their variants.

According to a fifteenth embodiment and a sixteenth embodiment, a computer readable medium of wireless communication storing a program of instructions, execution of which by a processor configures an apparatus to at least perform a method according to the first embodiment, the second embodiment, and any of their variants.

We claim:
1. An apparatus comprising:
   at least one processor; and
   at least one memory and computer program code, the at least one memory and the computer program code configured to, with the at least one processor, cause the apparatus at least to initiate at least one transient-inducing event;
   enter at least one first state associated with at least one first state requirement configuration; and transmit at least one first signal to a network entity based on the at least one first state requirement configuration, wherein the at least one first state requirement configuration comprises at least one error vector magnitude requirement associated with verification of at least one error vector magnitude during transient time period.

2. The apparatus of claim 1, wherein the at least one transient-inducing event comprises one or more of: at least one transmission start, at least one power control command, at least one resource block allocation size change, at least one power level change, at least one frequency hopping function, at least one transmitted channel change, or at least one transmission type change.

3. The apparatus of claim 1, wherein the at least one first state is associated with at least one first state requirement configuration.

4. The apparatus of claim 3, wherein the at least one first state requirement configuration comprises at least one requirement.

5. The apparatus of claim 4, wherein the at least one requirement of the at least one first state requirement configuration comprises one or more of: at least one power level requirement, at least one transient time, at least one signal quality requirement, at least one output power accuracy requirement, or at least one power off requirement.

6. The apparatus of claim 1, wherein the at least one transient-inducing event triggers the apparatus to enter the at least one first state.

7. The apparatus of claim 1, wherein the at least one first state comprises at least one of a power ramp up period or a power ramp down period.

8. The apparatus of claim 1, wherein the at least one first state is associated with at least one behavior unknown to the network entity.

9. The apparatus of claim 1, wherein the initiating is based on at least one command to initiate at least one transient-inducing event from the network entity.

10. A method comprising:
    initiating, by a user equipment, at least one transient-inducing event;
    entering, by the user equipment, at least one first state associated with at least one first state requirement configuration; and
    transmitting, by the user equipment, at least one first signal to a network entity based on the at least one first state requirement configuration,
    wherein the at least one first state requirement configuration comprises at least one error vector magnitude requirement associated with verification of at least one error vector magnitude during transient time period.

11. The method of claim 10, wherein the at least one transient-inducing event comprises one or more of: at least one transmission start, at least one power control command, at least one resource block allocation size change, at least one power level change, at least one frequency hopping function, at least one transmitted channel change, or at least one transmission type change.

12. The method of claim 10, wherein the at least one first state requirement configuration comprises at least one requirement.

13. The method of claim 12, wherein the at least one requirement of the at least one first state requirement configuration comprises one or more of: at least one power level requirement, at least one transient time, at least one signal quality requirement, at least one output power accuracy requirement, or at least one power off requirement.

14. The method of claim 10, wherein the at least one transient-inducing event triggers the user equipment to enter the at least one first state.

15. The method of claim 10, wherein the at least one first state comprises at least one of a power ramp up period or a power ramp down period.

16. The method of claim 10, wherein the at least one first state is associated with at least one behavior unknown to the network entity.

17. The method of claim 10, wherein the initiating by the user equipment is based on at least one command to initiate at least one transient-inducing event from the network entity.

18. An apparatus comprising:
    at least one processor; and
    at least one memory and computer program code, the at least one memory and the computer program code configured to, with the at least one processor, cause the apparatus at least to
    verify at least one first signal based on at least one first state requirement configuration received from a user equipment;
    receive at least one second signal from the user equipment based on at least one second state requirement configuration; and
    verify the at least one second signal based on at least one error vector magnitude requirement associated with verification of at least one error vector magnitude during transient time period.

19. The apparatus of claim 18, wherein the at least one first state requirement configuration comprises one or more of: at least one power level requirement, at least one transient time, at least one signal quality requirement, at least one output power accuracy requirement, at least one error vector magnitude requirement, or at least one power off requirement.

20. The apparatus of claim 18, wherein the verifying the at least one second signal comprising the at least one memory and the computer program code configured to, with the at least one processor, cause the apparatus at least to verify the at least one second signal based on one or more of: at least one power level requirement, or at least one signal quality requirement.

* * * * *